United States Patent [19]
Litchford et al.

[11] Patent Number: 4,733,241
[45] Date of Patent: Mar. 22, 1988

[54] POSITION FINDING AND COLLISION AVOIDANCE SYSTEM

[75] Inventors: George B. Litchford, Northport; Burton L. Hulland, Glenwood Landing, both of N.Y.

[73] Assignee: Litchstreet Co., Northport, N.Y.

[21] Appl. No.: 65,143

[22] Filed: Jun. 24, 1987

Related U.S. Application Data

[63] Continuation of Ser. No. 811,950, Dec. 20, 1985.

[51] Int. Cl.$^4$ .............................................. G01S 3/02
[52] U.S. Cl. ................................. 342/453; 342/450; 342/37; 342/386
[58] Field of Search ............... 342/450, 451, 452, 453, 342/454, 455, 458, 461, 386, 36, 37, 38

[56] References Cited

U.S. PATENT DOCUMENTS

| | | |
|---|---|---|
| 3,735,408 | 5/1973 | Litchford . |
| 4,021,802 | 5/1977 | Litchford ............................ 343/455 |
| 4,115,771 | 9/1978 | Litchford . |
| 4,128,839 | 12/1978 | McComas ............................ 343/455 |
| 4,293,857 | 10/1981 | Baldwin . |

Primary Examiner—Theodore M. Blum
Assistant Examiner—David Cain
Attorney, Agent, or Firm—Brumbaugh, Graves, Donohue & Raymond

[57] ABSTRACT

A position finding and collision avoidance system derives, at an Own station within the service area of an identified SSr at a known location, differential azimuth (A), differential time of arrival (T), identity and altitude data regarding any transponder-equipped Other station or stations within a predeterminable region surrounding Own station, from standard ATCRBS interrogations and replies. These data are used to compute the positions of Other stations for display at Own station.

12 Claims, 4 Drawing Figures

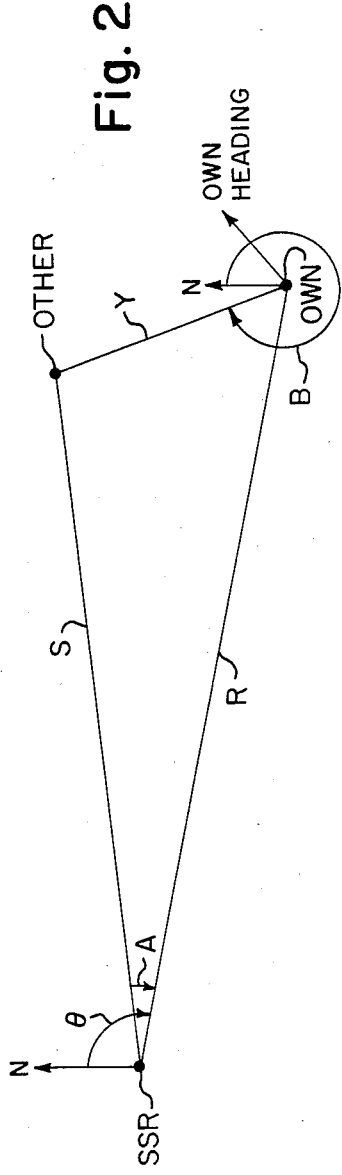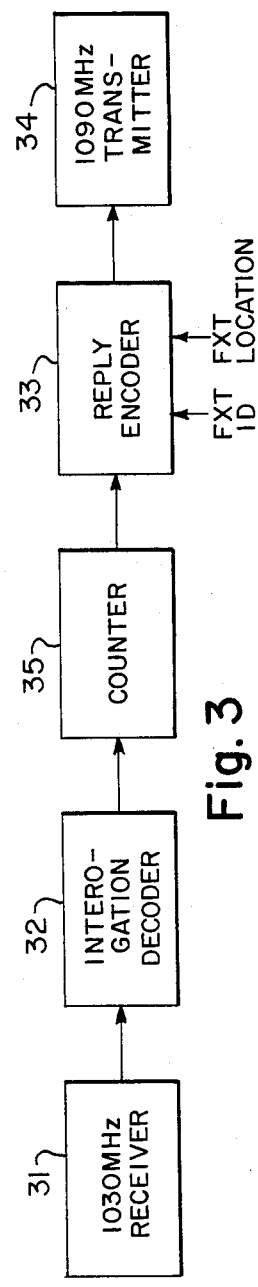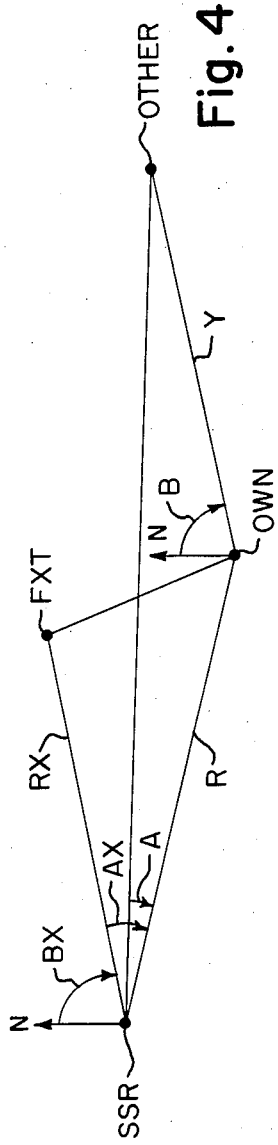
Fig. 2
Fig. 3
Fig. 4

POSITION FINDING AND COLLISION AVOIDANCE SYSTEM

This application is a continuation of application Ser. No. 811,950 filed on Dec. 20, 1985.

BACKGROUND OF THE INVENTION

This invention relates to position finding for vehicles such as aircraft, particularly for collision avoidance, using the standard Air Traffic Control Radio Beacon System (ATCRBS) signals to determine the positions of transponder-equipped stations within the service area of a secondary surveillance radar (SSR).

Many collision avoidance systems using the ATCRBS signals have been devised or proposed. Some simply provide an indication or alarm upon proximity of Own and Other stations; some require active signal transmissions for determination of range; others require uplink data transmissions from ground-based equipment. All are subject, to a greater or lesser extent, to production of false alarms, or missed alarms or radio signal interference, such failures occurring frequently under congested airspace conditions where least tolerable. Bearings from Own to Other stations, required for effective maneuvering to evade collision threats, have heretofore been difficult to obtain; proposed airborne directional antenna systems for this purpose have proven to be too unreliable and costly to be practical.

While North pulse transmissions from SSRs can be used to determine bearings, this invention avoids the need for so-called North pulse kits to be installed. More recently, a system meeting the needs of collision avoidance under most prevalent conditions has been successfully operated, as disclosed in our U.S. patent application Ser. No. 787,977 filed Oct. 16, 1985. However, that system is primarily useful only within the overlapping service areas of two or more SSRs. Such areas usually exist where there is enough air traffic to create an urgent need for collision avoidance systems. However, in remote or undeveloped regions where only one SSR may be active, there remains a need for an improved collision avoidance system.

SUMMARY OF THE INVENTION

According to this invention, techniques disclosed in U.S. Pat. No. 4,021,802, and the patents referred to therein, are used with stored data representative of the locations and signatures of all, or an appropriate selection, of existing SSRs to determine passively at an Own station the positions of any transponder-equipped Other stations within an area of interest that is served by at least one SSR. The position of Own station may be determined independently by on-board Loran C receiver means, for example, or from the SSR interrogations and replies elicited thereby from a transponder at a known location.

BRIEF DESCRIPTION OF THE DRAWINGS

FIG. 2 is a geometrical diagram used in explaining the operation of the system in FIG. 1;

FIG. 3 is a block diagram of a transponder modified for use with the system of FIG. 1 in an alternative mode of operation; and FIG. 4 is a geometrical diagram used in explaining the alternative mode of operation of the system of FIG. 4.

DESCRIPTION OF EXEMPLARY EMBODIMENTS

Figure 1:
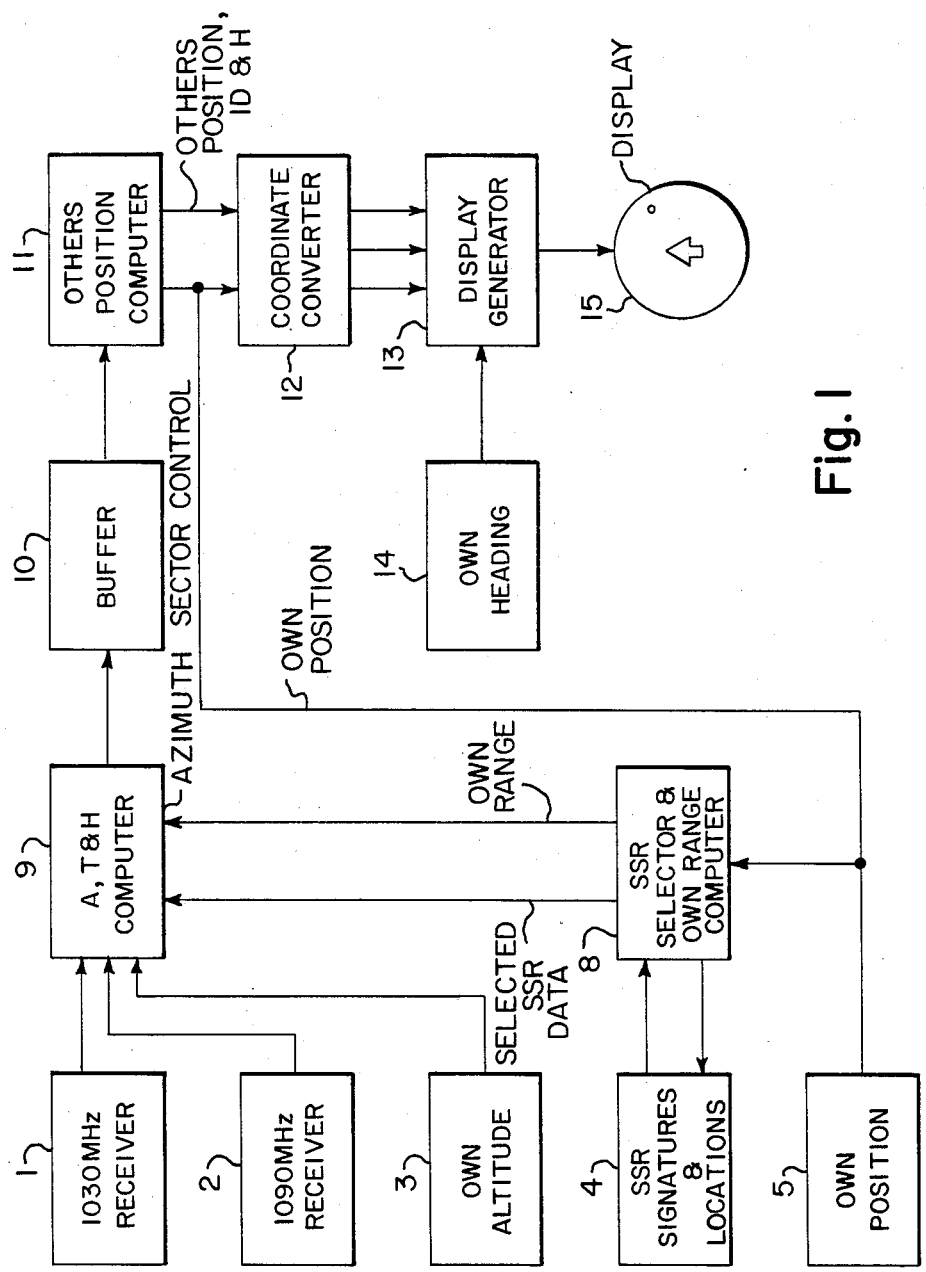
FIG. 1 is a block diagram of a preferred embodiment of the invention.

Referring to FIG. 1, the equipment of an Own station, for example, aboard an aircraft, includes a receiver 1 adapted to receive conventional ATCRBS interrogations at 1030 MHz and to provide an output pulse upon receiving each interrogation. A 1090 MHz receiver 2 is adapted to receive the replies of any transponders at Other stations within its range, providing pulse outputs corresponding to such replies. An altimeter 3 is arranged to provide a signal representing Own's barometric altitude.

A storage device 4, preferably a non-volatile register such as a read-only memory (ROM), contains an organized listing of all SSRs that might be used with the system, including the signature and geographical location of each.

The signature of an SSR is the unique combination of main beam rotation period and pulse repetition characteristic assigned to that particular SSR. The term "characteristic" is used to account for the fact that some SSRs are assigned fixed pulse repetition periods, and others are assigned so-called "staggered" pulse repetition periods, wherein the time between successive interrogations varies in a predetermined sequence. Since there are only a few thousand ATCRBS SSRs throughout the world, it is readily feasible to store the signatures and locations of all of them in the device 4 if desired.

Own's position finding means 5, which may be any precision locating apparatus, such as a Global Satellite Positioning System receiver or a Loran C receiver, provides data representing Own's geographic location for use by an SSR selector 8, which includes data comparator means arranged in known manner to select, on the basis of Own's position and SSR positional data stored in device 4, a suitably located SSR within, for example, 100 miles of Own's position. The signature and location of the selected SSR are supplied to an A, T and H computer 9. Selector 8 also includes means for computing Own's range from the selected SSR for use by the computer 9.

The interrogation-related pulses from receiver 1, the Others reply-related pulses from receiver 2 and Own altitude data from device 3 are also supplied as inputs to computer 9, which may be essentially the same as shown and described in U.S. Pat. No. 4,021,802, with reference to the upper three-quarters of FIG. 3 thereof, specifically the elements designated therein by the reference numerals 301–304 and 306–319.

The PRC selectors corresponding to elements 301 and 304 of said patent are adjusted by the SSR selector 8 to accept the interrogations of the selected SSR and the replies elicited thereby. The widened azimuth sector gate, corresponding to element 310 of said patent, is arranged to be controlled in inverse fashion by Own's range from the selected SSR. For example, at a range of 100 miles, the azimuth sector may be the width of the SSR beam, say three degrees. At lesser ranges, the azimuth sector is increased, up to 60 degrees, for example, at ranges of less than five miles.

The computer 9 operates in the manner described in said U.S. Pat. No. 4,021,802 to produce output data representing the identity of each Other station within the area of interest, and its differential azimuth A, differential time of arrival T and differential altitude H with respect to Own. Said data will appear in separate bursts, sequentially as the SSR beam sweeps past Others' positions.

The data from computer 9 are stored as they become available in a buffer device 10, which comprises a set of registers, each arranged to store associatively the A, T and H data relating to an identified Other station, together with said Other's identity. As each such set of data is completed, the buffer 10 presents it to a position computer 11. When the computer 11 has completed any ongoing calculation and is free to do so, it accepts the presented data set, freeing the respective buffer register for accumulation of another set.

The computer 11 may be a small general purpose computer or a dedicated device, programmed to calculate Others' positions by trigonometric operations on the input data. Ordinarily it will complete the calculation on a data set before a subsequent one becomes available. Otherwise, the data is retained in the buffer until the computer is ready to accept it.

Own's and Others' positional data, which may be in latitude-longitude format, for example, with Others tagged by identity codes, are supplied to a coordinate converter 12 of known type. The converter produces outputs representing ranges and bearings of identified Others from Own. A display generator 13, also of known type, uses said outputs to produce signals for controlling a display device 15, such as a cathode ray tube, to exhibit Others' ranges, bearings and identities. Own's heading, obtained from a device 14 such as a compass, may also be supplied to the generator to orient the display with respect to Own's heading. Own's positional coordinates, such as latitude and longitude, may also be exhibited on display 15 for navigational use by Own.

FIG. 2 is a map-like representation of the known positions of a selected SSR and Own station, and the initially unknown position of an Other station. The range R between Own and the SSR is provided by device 8. The differential azimuth A of Other from Own is determined by computer 9, as is also the differential time of arrival T. The initially unknown ranges of Other from the SSR and Own are designated S and Y, respectively.

After accounting for systemic delays, $$T=(S+Y-R)/c,$$

where c is the speed of radio propagation. From this relationship and the known values of A and R, S and B may be calculated using the law of cosines, and the angle between lines S and Y determined. From this angle and Own's known bearing from the SSR, Other's bearing from Own is readily determinable. Said bearing may be referred to Own's heading, using Own's compass. Substantially any number of Other stations in the area of interest are dealt with similarly, without requiring any radio transmissions other than those occurring in the normal operation of the ATCRBS system.

In some regions where there is SSR service, collision avoidance may be desirable in the absence of Loran C or similar navigational aids. In such instances, Own's position may be obtained by means of a transponder placed at a fixed known location such as a tower or a mountain top in the area of interest. Referring to FIG. 3, a standard transponder including a 1030 MHz receiver 31, interrogation decoder 32, reply encoder 33 and 1090 MHz transmitter 34 may be modified by adding a pulse counter 35 to count the reply trigger pulses that are produced by the decoder 32 and produce output pulses only upon certain ones of the typical burst of, for example, 18 interrogations that occur while the SSR beam passes, for example the second and sixteenth. These pulses are used to trigger the reply encoder, so the transponder will transmit only twice during a beam passage, minimizing possible interference with ATCRBS. An otherwise unused ID code and the location data of the transponder are set in the encoder, for transmissions in sequential replies. For example, the first reply during each sweep of the SSR beam could be the assigned identity and the second reply the magnitude of one of the transponder positional coordinates. These coordinates may be expressed as latitude and longitude, or as range and bearing from the SSR. Successive beam passages may be used to transmit additional data such as the transponder altitude, for example. The computer 11 of FIG. 1 may be arranged to exclude the fixed transponder data, on the basis of its identity coding, from the computations of Others' positions, to prevent confusion with Others in its vicinity.

Referring to FIG. 4, the fixed transponder FXT is at a known range RX and bearing BX from the SSR. The computers 9 and 11 are arranged to provide Own's differential azimuth AX and differential time of arrival TX from FXT, and calculate therefrom Own's range R and bearing from the SSR. Using these data, Other's range Y and bearing B are calculated as previously described.

We claim:

1. Apparatus at an Own station within the service area of an SSR for determining the position of a transponder-equipped Other station within said service area, including at the Own station:
   a. means for receiving the interrogations transmitted by said SSR,
   b. means for geographically locating said SSR,
   c. means for receiving replies transmitted from said Other station in response to said interrogations,
   d. means for determining, from the time relationships between said received interrogations and said replies, data defining the position of said Other station with respect to the Own station in coordinates of differential azimuth (A),
   e. means for determining, from the time relationships between said received interrogations and said replies, data defining the position of said Other station with respect to the Own station in coordinates of differential time of arrival (T),
   f. means for determining the position of the Own station, and
   g. means for computing, from said data and the known positions of said SSR and said Own station, the position of said Other station.

2. The apparatus of claim 1, further including widened azimuth gate means, and means for adjusting the width of the azimuth gate in accordance with the calculated range of the Own station from said SSR.

3. The apparatus of claim 1, wherein said means f is a receiver system adapted for operation with precision locating equipment such as Loran C or Global Satellite Positioning Systems.

4. The apparatus of claim 1, wherein said means f includes means for determining, from the time relationships between said received interrogations and the replies from a transponder at a known location, data defining Own's position with respect to said known location transponder in A and T coordinates, and computing, from said last mentioned data and the known positions of said SSR and said known location transponder, the position of said Own station.

5. The apparatus of claim 4, wherein said known location transponder cooperates with the apparatus of claim 4, and includes:
   h. an interrogation receiver and decoder,
   i. a reply transmitter,
   j. means for producing reply trigger pulses in response to received interrogations,
   k. means for counting the interrogations received during passage of an SSR beam, and
   l. means responsive to said counting means to apply trigger pulses to said transmitter upon occurrence of selected ones of said counted pulses.

6. The apparatus of claim 5, including means for coding replies from said known location transponder to convey its identity and position.

7. The method of determining, at an Own station within the service area of an SSR, the position of a transponder-equipped Other station within said service area, including the steps of:
   a. receiving the interrogations transmitted by said SSR,
   b. geographically locating said SSR,
   c. receiving replies transmitted from said Other station in response to said interrogations,
   d. determining, from the time relationships between said interrogations and said replies data defining the position of said Other station with respect to the Own station in coordinates of differential azimuth (A),
   e. determining, from the time relationships between said received interrogations and said replies, data defining the position of said Other station with respect to the Own station in coordinates of differential time of arrival (T),
   f. determining the position of the Own station, and
   g. computing, from said data and the known positions of said SSR and said Own station the position of said Other station.

8. The method of claim 7, further including the steps of providing a widened common azimuth sector of operation about the position of said Own station, and adjusting the width of said sector inversely in accordance with distance from the SSR.

9. The method of claim 7, wherein step f comprises determining Own's position by reception and processing of precision position locating transmissions such as Loran C transmissions or Global Satellite Positioning Systems transmissions.

10. The method of claim 7, wherein said step f includes determining, from the time relationships between said received interrogations and the replies from a transponder at a known location, data defining Own's position with respect to said known location transponder in A and T coordinates, and computing, from said last-mentioned data and the known positions of said SSR and said known location transponder, the position of said Own station.

11. The method of claim 10, further including the steps of counting the reply trigger pulses produced in response to interrogations received by said known location transponder during passage of an SSR beam, and triggering said known location transponder to reply only upon occurrence of selected ones of said counted pulses.

12. The method of claim 10, further including the steps of coding replies from said last known location transponder to convey its identity and position.

* * * * *